UNITED STATES PATENT OFFICE.

JACOB BOLLINGER, OF TRIPP, (DAKOTA TERRITORY,) SOUTH DAKOTA.

PAINT COMPOSITION.

SPECIFICATION forming part of Letters Patent No. 419,106, dated January 7, 1890.

Application filed July 27, 1889. Serial No. 318,925. (No specimens.)

*To all whom it may concern:*

Be it known that I, JACOB BOLLINGER, a citizen of the United States, and a resident of Tripp, in the county of Hutchinson and Territory of Dakota, have invented certain new and useful Improvements in Paint Compositions; and I do declare the following to be a full, clear, and exact description of the invention, such as will enable others skilled in the art to which it appertains to make and use the same.

This invention relates to paint compositions; and it consists in the chemical and mechanical admixture of the various ingredients constituting the same, as hereinafter described.

The object of the invention is to provide a new and economical protective covering for surfaces exposed to the elements, and at the same time present a smooth or glazed surface, in order to give exterior finish to the work.

The composition or paint is composed of sal-ammoniac water, quicklime, boiled linseed-oil, and salt-water mixed in the following manner. One ounce of sal-ammoniac is dissolved in two quarts of water and the solution reserved. A sufficient quantity of quicklime is sprinkled with the ammoniacal solution until the lime has been reduced to a powder. The efflore or powder which is the result of the procedure constitutes the body of the paint which is now in process of manufacture. Take two quarts of the powder above mentioned and add thereto two quarts and one-half pint of boiled linseed-oil, and, after stirring thoroughly, seal the mixture in a vessel, so as to confine any gas which may be given off, and let the mixture stand twenty-four hours. After the mixture is unsealed add gradually a sufficient quantity of salt-water to produce the desired consistency, constantly stirring the mixture in order to thoroughly incorporate the ingredients. The salt-water is produced by the addition of sixteen ounces of salt to each gallon of water.

What I claim as new, and desire to secure by Letters Patent, is—

A paint composition consisting of sal-ammoniac, quicklime, boiled oil, salt, and water combined, substantially in the proportions herein specified.

In testimony whereof I affix my signature in presence of two witnesses.

JACOB BOLLINGER.

Witnesses:
HENRY KLATT, Jr.,
PAUL EINKOFF.